(12) United States Patent
Shim et al.

(10) Patent No.: US 10,001,890 B2
(45) Date of Patent: Jun. 19, 2018

(54) TOUCH TAG RECOGNIZABLE THROUGH CAPACITIVE TOUCH PANEL, INFORMATION RECOGNITION METHOD THEREOF AND INFORMATION PROVIDING METHOD USING SAME

(71) Applicant: KOREA INSTITUTE OF INDUSTRIAL TECHNOLOGY, Chungcheongnam-do (KR)

(72) Inventors: Jin Kie Shim, Seoul (KR); Chang Kee Lee, Seoul (KR); Sang Bong Lee, Gyeonggi-do (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 130 days.

(21) Appl. No.: 15/033,339

(22) PCT Filed: Dec. 13, 2013

(86) PCT No.: PCT/KR2013/011590
§ 371 (c)(1),
(2) Date: Jun. 30, 2016

(87) PCT Pub. No.: WO2015/064827
PCT Pub. Date: May 7, 2015

(65) Prior Publication Data
US 2016/0306463 A1 Oct. 20, 2016

(30) Foreign Application Priority Data
Nov. 1, 2013 (KR) .................. 10-2013-0132050

(51) Int. Cl.
*G06F 3/045* (2006.01)
*G06F 3/044* (2006.01)
(Continued)

(52) U.S. Cl.
CPC ............ *G06F 3/044* (2013.01); *G06F 3/0488* (2013.01); *G06K 19/067* (2013.01); *G06F 2203/0384* (2013.01); *G06F 2203/04106* (2013.01)

(58) Field of Classification Search
CPC .................. G06F 3/044; G06F 3/0468; G06F 2203/0384; G06F 2203/04106; G06K 19/067
(Continued)

(56) References Cited

U.S. PATENT DOCUMENTS

2007/0057793 A1* 3/2007 Alden .................. G06F 3/0202
340/572.1
2008/0122799 A1* 5/2008 Pryor .................... G06F 3/0312
345/173
(Continued)

FOREIGN PATENT DOCUMENTS

KR 20130101605 A 9/2013
WO 2011016664 A2 2/2011
(Continued)

*Primary Examiner* — Mark Regn
(74) *Attorney, Agent, or Firm* — McNees Wallace & Nurick LLC

(57) ABSTRACT

The present invention provides a touch tag having a conductivity pattern corresponding to a touch point of a capacitive touch panel. A capacitive touch tag according to the present invention includes: a substrate; a plurality of capacitive touch points which are formed on the substrate and are arranged at arbitrary positions on a virtual lattice corresponding to a touch input sector of a capacitive touch panel of a personal information device; a conductive wire for connecting the capacitive touch points; and an electric charge transfer unit for transferring electric charges to the capacitive touch points through the conductive wire. When the capacitive touch tag comes into contact with a smartphone, the capacitive touch points are recognized according (Continued)

to a predetermined rule, a result of the recognition is transmitted to a server, and information corresponding thereto is received and displayed.

18 Claims, 19 Drawing Sheets

(51) Int. Cl.
*G06F 3/0488* (2013.01)
*G06K 19/067* (2006.01)

(58) Field of Classification Search
USPC .......................................................... 345/174
See application file for complete search history.

(56) References Cited

U.S. PATENT DOCUMENTS

| | | | |
|---|---|---|---|
| 2008/0211779 A1* | 9/2008 | Pryor ................. | G01C 21/3664 345/173 |
| 2012/0176382 A1 | 7/2012 | Noh | |
| 2013/0271265 A1* | 10/2013 | Finn ..................... | H01Q 1/2225 340/10.1 |

FOREIGN PATENT DOCUMENTS

| | | | |
|---|---|---|---|
| WO | 2012057459 A1 | 5/2012 | |
| WO | 2012081777 A1 | 6/2012 | |
| WO | 2013018971 A1 | 7/2013 | |

* cited by examiner

DRAWING LEGEND INSERTION

Fig. 8C

TOUCH TAG RECOGNIZABLE THROUGH CAPACITIVE TOUCH PANEL, INFORMATION RECOGNITION METHOD THEREOF AND INFORMATION PROVIDING METHOD USING SAME

TECHNICAL FIELD

The present invention relates to a touch tag which can be recognized through a capacitive touch panel, a method for recognizing information thereof, and a method for providing information using the same.

BACKGROUND ART

One-dimensional or two-dimensional barcode systems are widely used as an automatic recognition technology which can process information media in real time.

A barcode recognition system recognizes a general barcode symbol using a dedicated scanner, and in recent years, an application program for a personal information processing apparatus such as a smartphone, which can photograph and decode an image of a barcode, is developed and used.

However, in this way, when the image of the barcode symbol is acquired and recognized, an inconvenient operation of photographing the image while a screen of the smartphone and a screen of the barcode are exactly matched with each other, by a user, is needed, and when the image is not accurately acquired, there are problems in that incorrect information is recognized or several times of reoperations are needed.

Meanwhile, in the barcode systems, the barcode symbol itself is exposed to the outside, and thus, it is considered that information recognized through the symbol is originally exposed, and there is no method which can provide the information without exposing the barcode symbol. Further, it is concerned that the exposed barcode symbol is damaged by external impact.

DISCLOSURE

Technical Problem

The present invention is conceived from the above-described technical background, and an aspect of the present invention is to provide an information media which can easily perform reading out using a personal information processing apparatus such as a smartphone, and an information recognition method therefor, and an information providing method using the same.

Another aspect of the present invention is to provide an information media which can the large number of cases using a small size, and an information recognition method therefor.

Yet another aspect of the present invention is to provide an information media which does not leak information to the outside, and can prevent a damage by external impact, and a recognition method therefor.

Technical Solution

In order to solve the above-described problems, the present invention provides a touch tag having a conductivity pattern corresponding to a touch point of a capacitive touch panel.

That is, a capacitive touch tag according to an aspect of the present invention includes: a substrate; a plurality of capacitive touch points which are formed on the substrate and are arranged at arbitrary positions on a virtual lattice corresponding to a touch input sector of a capacitive touch panel of a personal information device; a conductive wire for connecting the capacitive touch points; and an electric charge transfer unit for transferring electric charges to the capacitive touch points through the conductive wire, wherein the capacitive touch points include a first point determined as a start point according to a predetermined first rule, and a two-dimensional linear pattern, formed by connecting the capacitive touch points, starting from the first point, by a virtual line according to a predetermined second rule, corresponds to information on the capacitive touch tag.

In the capacitive touch tag according to another aspect of the present invention, the capacitive touch points include a first point located inside a rectangle, the size and the direction of which can be determined according to a predetermined specific rule, and a matrix having a certain size, which is created in a state in which the first point and a position on the lattice within the rectangle, where the first point is not formed, are distinguished from each other, corresponds to information on the capacitive touch tag.

In the capacitive touch tag according to yet another aspect of the present invention, there are three or more capacitive touch points, and coordinate values including values of three or more angles configured by a virtual line connecting the capacitive touch points to each other correspond to information on the capacitive touch tag.

The capacitive touch tag may further include a protection film for covering the capacitive touch points and the conductive wire, and the protection film is made of an opaque material, and thus, may be formed such that the arrangement of the capacitive touch points cannot be recognized from the outside.

It is preferred that the electric charge transfer unit is a battery which can generate electric charges and transfer the electric charges to the capacitive touch points, or a conductive contact unit which can transfer the electric charges to the capacitive touch points while being in contact with a finger.

A method for recognizing a capacitive touch tag according to another aspect of the present invention is provided. Provided is the method for recognizing information on a capacitive touch tag by a personal touch panel as the capacitive touch tag, including: a substrate; a plurality of capacitive touch points which are formed on the substrate and are arranged on a predetermined position on a virtual lattice corresponding to a touch input sector of a capacitive touch panel of the personal information device; a conductive wire for connecting the capacitive touch points to each other; and an electric charge transfer unit for transferring electric charges to the capacitive touch points through the conductive wire, comes into contact with the capacitive touch panel. The method includes: recognizing a position of the touch input sector corresponding to the capacitive touch point; and generating coordinate values including values of inner angles of a polygon formed by a virtual line for connecting the capacitive touch points to each other.

A method for recognizing information on a capacitive touch tag according to another aspect of the present invention includes: recognizing a position of the touch input sector corresponding to the capacitive touch points; and forming a two-dimensional linear pattern by connecting the capacitive touch points to each other by a virtual line according to a predetermined second rule, starting from a first point determined as a starting point according to a predetermined first rule among the plurality of capacitive touch points.

A method for recognizing information on a capacitive touch tag according to yet another aspect of the present invention includes: recognizing a position of the touch input sector corresponding to the capacitive touch point; and creating a matrix having a certain size, in a state in which a first point which is located inside a rectangle, the size and the direction of which can be determined according to a predetermined specific rule, and corresponds to the capacitive touch points, and a second point which is located inside the rectangle and corresponds to a position of the touch input sector where the first point is not formed are distinguished from each other by different values.

A method for providing information using a capacitive touch tag according to another aspect of the present invention includes: recognizing information on a capacitive touch tag according to the method; converting the recognized information into numerical data corresponding to at least one of the coordinates value, the two-dimensional linear pattern, and the matrix; transmitting the communication data to the server; receiving information data corresponding to the numerical data from the server; and displaying the information data through the smartphone device.

Here, the method may further include: receiving feedback data related to the information data from a user; and transmitting the feedback data to the server, wherein the information data may further include the feedback data.

Advantageous Effects

The present invention can generate the large number of data patterns using several capacitive touch points, thereby recognizing information of many products using a small touch tag, and such information can be easily read out using a personal information processing apparatus such as a smartphone.

Further, when a capacitive touch tag according to an embodiment of the present invention is used, information is not leaked to the outside, a damage by external impact can be prevented, information corresponding to the capacitive touch tag is stored in a server, and only when matching is satisfied, the information is provided, so that convenient updating is possible while maintaining the security of the information.

DESCRIPTION OF THE INVENTION

FIGS. 6A to 9C illustrate a configuration example of a touch tag and an information recognition method therefor according to various embodiments of the present invention, FIGS. 6A, 7A, 8A and 9A are schematic views illustrating capacitive touch tags, FIGS. 6B, 7B, 8B and 9B are schematic views illustrating states in which the capacitive touch tags is recognized through the capacitive touch panel of the smartphone device, and FIGS. 6C, 7C, 8C and 9C are schematic views illustrating information recognition methods.

Figure 10:
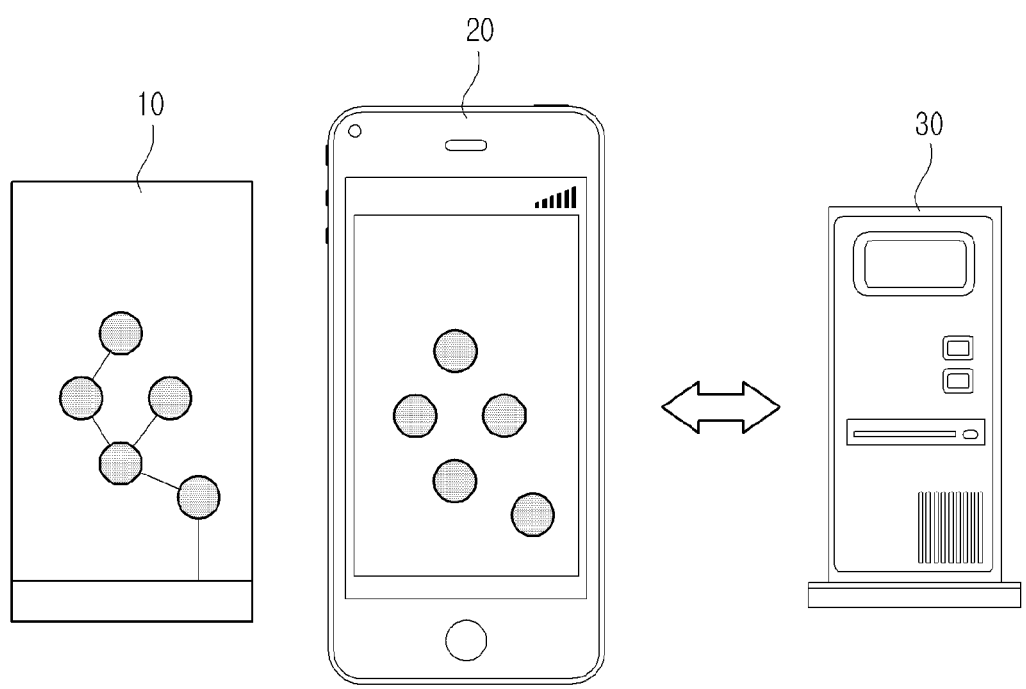
Figure 11:
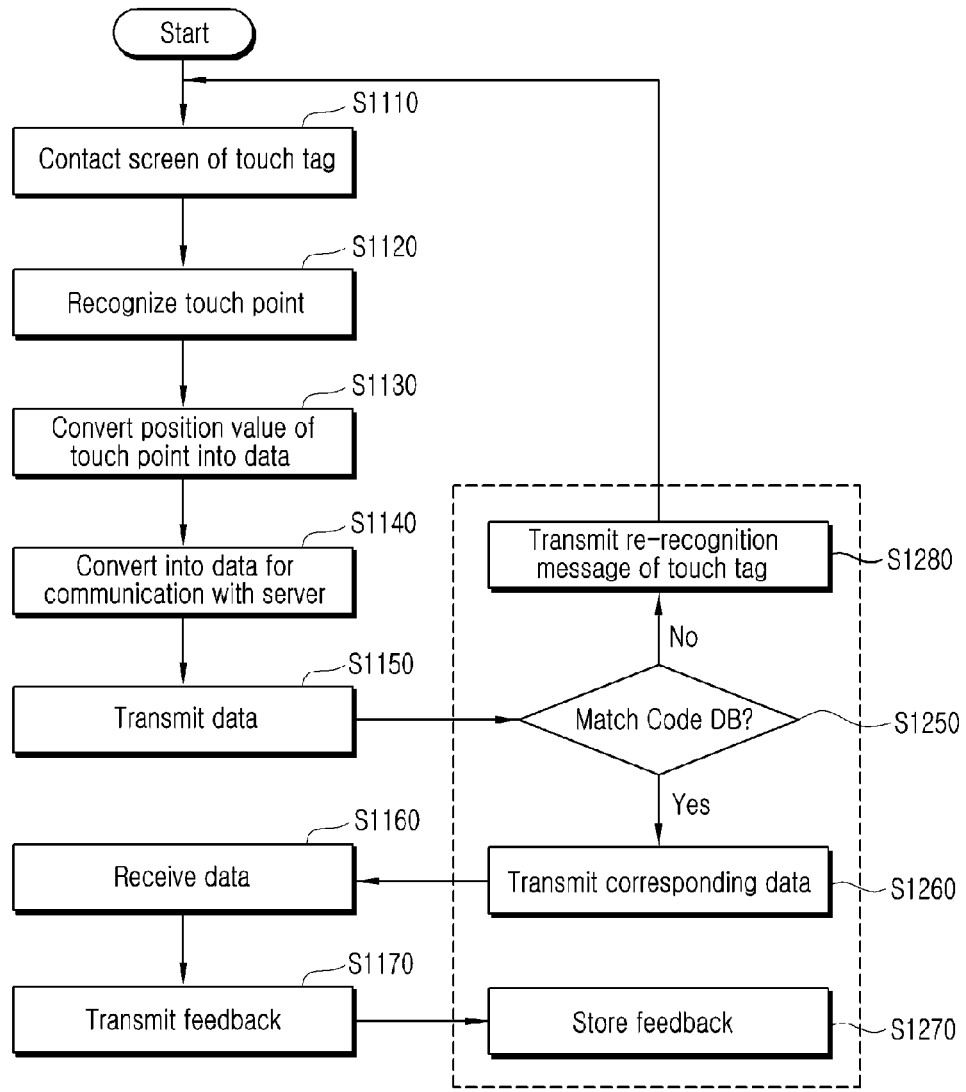

FIG. 10 schematically illustrates the entire configuration of an information recognition system using a touch tag and the smartphone device according to the embodiment of the present invention; and FIG. 11 is a flowchart illustrating the entire configuration of an information recognition method using the touch tag and the smartphone device according to the embodiment of the present invention.

BEST MODE

Now, exemplary embodiments of a capacitive touch tang and a recognition method therefor according to the present invention will be described in detail with reference to the accompanying drawings.

Figure 1:
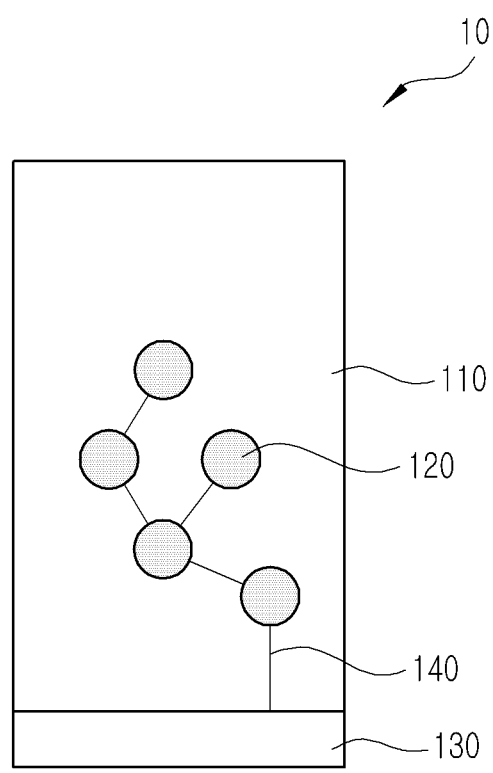
FIG. 1 is a schematic view illustrating a capacitive touch tag according to an embodiment of the present invention.

FIG. 1 is a schematic view illustrating a capacitive touch tag (hereinafter, referred to as "capacitive touch tag", or briefly referred to as "capacitive tag" or "touch tag") according to an embodiment of the present invention.

As illustrated in FIG. 1, a capacitive touch tag 10 according to the embodiment of the present invention includes a substrate 110, a plurality of capacitive touch points 120 (hereinafter, referred to as "capacitive touch point" or briefly referred to as "capacitive point" or "touch point") formed on the substrate 110 and arranged at arbitrary positions on a lattice, and an electric charge transfer unit 130 electrically connected to the capacitive points 120.

In order to guarantee that electric charges are transferred from the electric charge transfer unit 130 to all the capacitive points 120, the capacitive points 120 are connected to each other by a conductive wire 140.

The capacitive touch tag 10 according to the embodiment of the present invention is used for reading out information by a personal information processing apparatus, such as a smartphone device (hereinafter, referred to as "smartphone device" or briefly referred to as "smartphone"), using a capacitive touch panel as an input unit. To this end, electric charges should be transferred to the capacitive points 120.

To this end, the electric charge transfer unit 130 may be implemented by a battery which can directly generate electric charges and transfer the electric charges to the capacitive points 120, or a conductive contact unit which can transfer electric charges to the capacitive points 120 by contact with a finger, and the like.

Meanwhile, although not illustrated in FIG. 1, a protection film is formed on the substrate 110 having the capacitive points 120 formed therein, so that damage to the capacitive points 120 is prevented, and at the same time, the arrangement of the capacitive points 120 is not identified by naked eyes.

Figure 2:
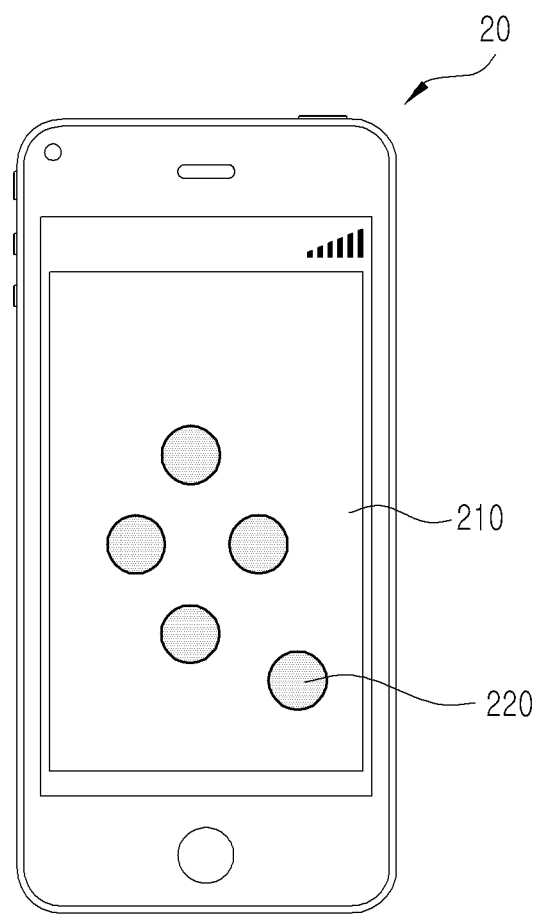
FIG. 2 is a schematic view illustrating a situation in which a capacitive touch tag as illustrated in FIG. 1 is recognized by a smartphone device.

FIG. 2 is a schematic view illustrating a situation in which a capacitive touch tag as illustrated in FIG. 1 is recognized by a smartphone device.

When the touch tag as illustrated in FIG. 1 comes into contact with a touch panel 210 of a smartphone 20, the smartphone 20 recognizes points 220 respectively corresponding to the capacitive points 120 formed on the touch tag 10, as illustrated in FIG. 2.

For the convenience of description, the capacitive points 120, and the points 220 of the touch panel 210 corresponding thereto are illustrated relatively large in FIGS. 1 and 2.

However, the actual size of the capacitive points 120 may be small in a degree corresponding to the size of a touch input sector of the touch panel 210, and the actual size of the points 220 of the touch panel 210 corresponding thereto are the same.

Figure 3:
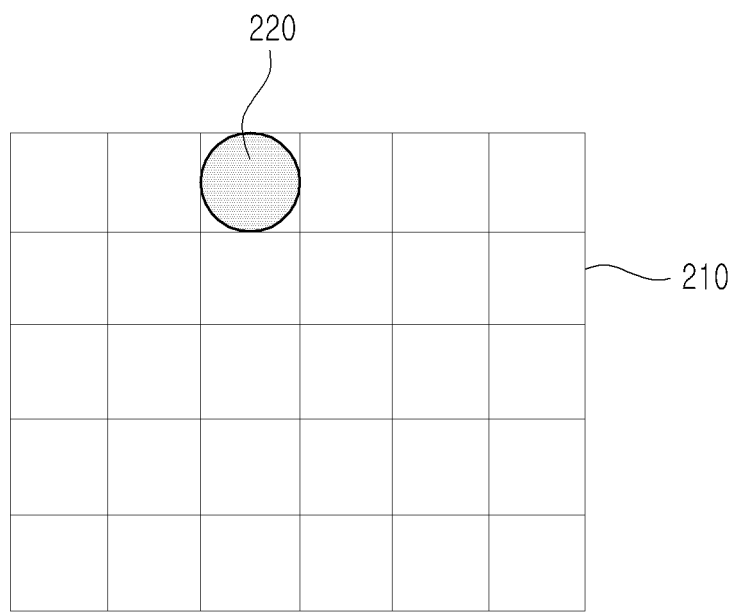
FIG. 3 is a schematic view illustrating a method for recognizing an individual capacitive point by a smartphone, wherein each region of a lattice represents a touch input sector.

FIG. 3 is a schematic view illustrating a method for recognizing an individual capacitive point by a smartphone, wherein each region of a lattice represents a touch input sector.

As illustrated in FIG. 3, at a moment when the capacitive points 120 of the touch tag 10 and the touch panel 210 come into contact with each other, coordinates of a corresponding touch input sector are recognized.

Although only one point is illustrated in FIG. 3, it is obvious that coordinates of touch input sectors for a plurality of points can be simultaneously recognized.

In order to recognize such coordinates and process the recognized coordinates in a form used by an information recognition method according to the embodiment of the present invention, a specific application program may be installed and used in the smartphone.

Figure 4:
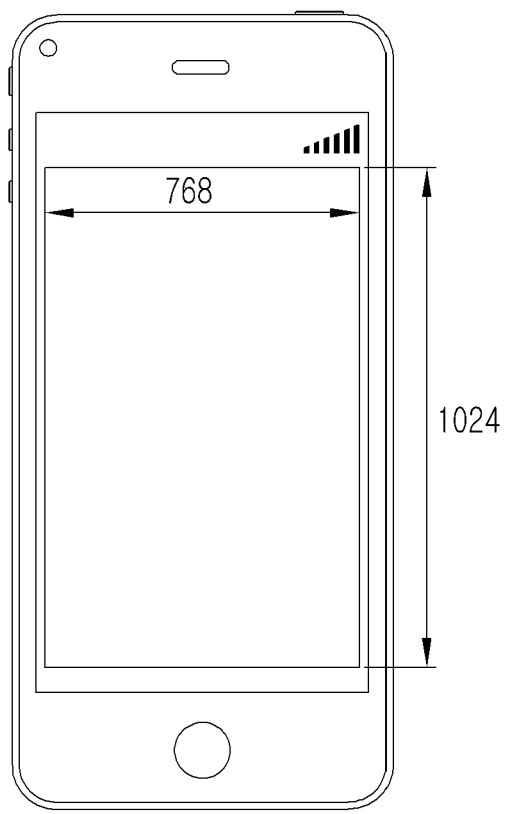
FIG. 4 illustrates a resolution of a capacitive touch panel of the smartphone device.

A sector of each input can be created such that the input range of a capacitive signal by a capacitive point is matched with a resolution of the touch panel. For example, as illustrated in FIG. 4, in case of a device having a resolution of 1024×768, 786,432 capacitive points may be created.

Figure 5:
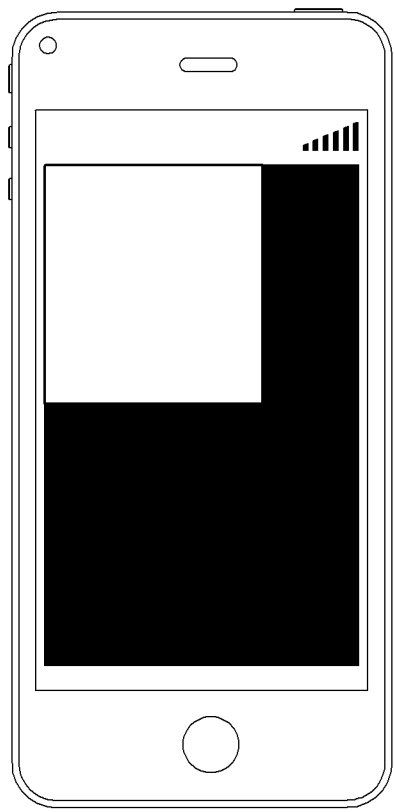
FIG. 5 illustrates a recognition range of the capacitive touch tag for the capacitive touch panel of the smartphone device according to an embodiment of the present invention.

The input range of the capacitive points can be adjusted through the application program. For example, as illustrated in FIG. 5, only some regions of the touch panel may be used as an input range. It is obvious that the maximum range may be expanded up to the resolution range of each hardware device.

Figure 6A:
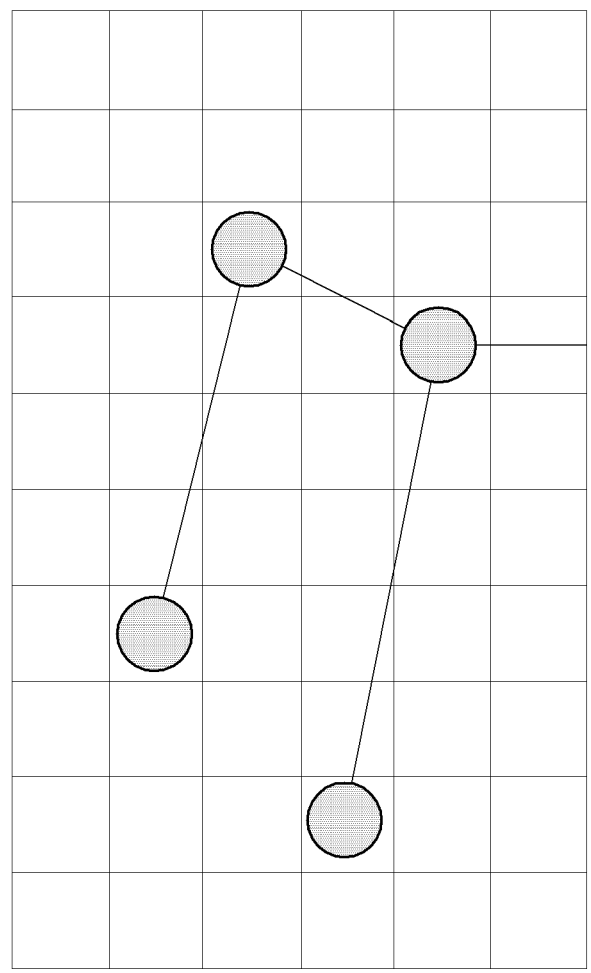
Figure 6B:
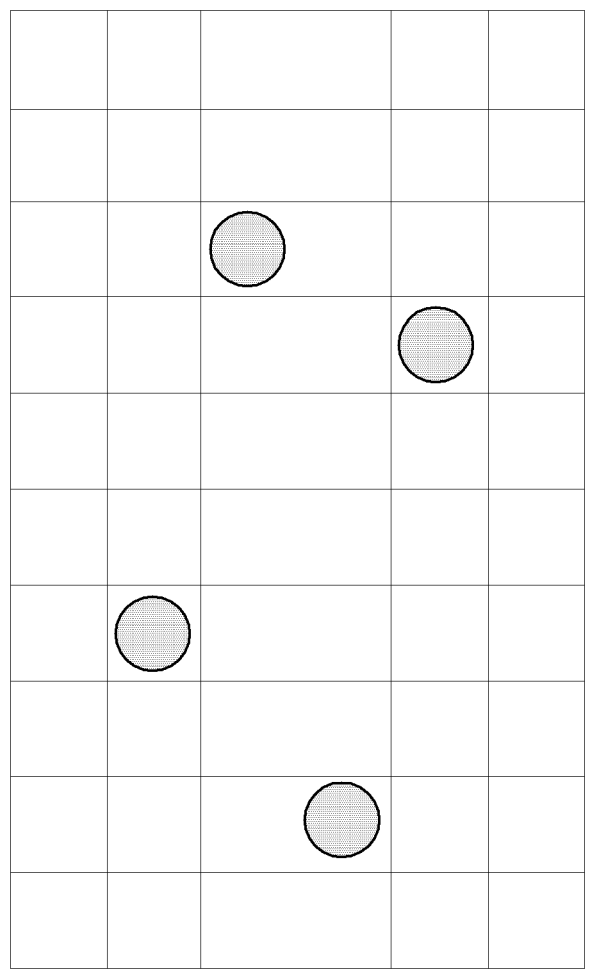
Figure 6C:
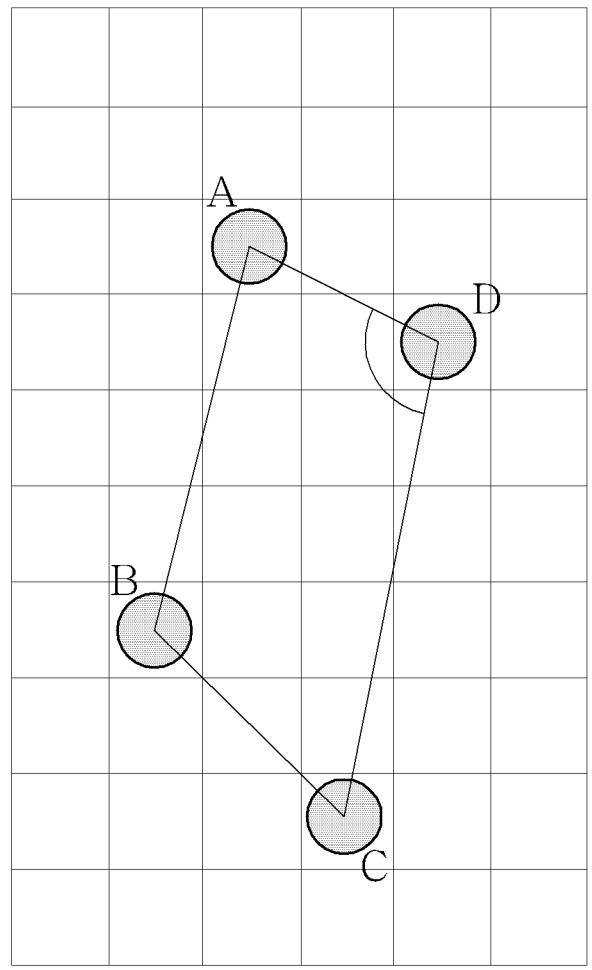

FIGS. 6A to 6C illustrate a configuration example of a touch tag used in the information recognition method and a recognition method therefor according to an embodiment of the present invention, FIG. 6A is a schematic view illustrating a capacitive touch tag, FIG. 6B is a schematic view illustrating a state in which the capacitive touch tag as illustrated in FIG. 6A is recognized through the capacitive touch panel of the smartphone device, and FIG. 6C is a schematic view illustrating an information recognition method using each point recognized as in FIG. 6B.

As illustrated in FIG. 6A, four capacitive points are formed on the touch tag, and the capacitive points are connected to each other by a conductive wire. It is obvious that a connection method for the capacitive points is not limited to that illustrated in FIG. 6A, and electric charges only need to be supplied to all necessary capacitive points.

FIG. 6B illustrates a state in which the touch tag of FIG. 6A is recognized through the touch panel of the smartphone device, wherein the touch tag is recognized in the same direction as that illustrated in FIG. 6A. However, in the prevent embodiment, in recognizing the touch tags, the touch tags should not be necessarily recognized in such a direction, and the capacitive points on the touch tags only need to be recognized on the touch panel, regardless of the direction or the positions of the touch tags.

Here, as illustrated in FIG. 6C, four recognized points A, B, C, and D are connected to each other by a virtual line, values of internal angles of a figure (in case of FIG. 6C, quadrangle) created by the virtual line are extracted, and the values are arranged according to a predetermined rule.

For example, when the recognized values of the internal angles are A: 88°, B: 110°, C: 75°, and D: 87°, and an arrangement rule is "the values are arranged in descending order from a largest angle, but 75° is located foremost", a four-digit address (coordinate) such as (75, 110, 88, 87) can be obtained.

The address configured by such numbers is stored in the form of an arrangement function, and each stored value is linked to a server address corresponding to the corresponding value which will be described below. That is, this is the same principle as allowing an IP address configured by four numbers to correspond to the corresponding server.

Here, the number of angles of a polygon which can be expressed in a touch tag is not limited. That is, all a triangle to a polygon having three or more angles may be used according to an amount of desired information.

A rule for arranging the recognized information is stored in an application program in advance or may be obtained by a request to a server or a push method from the server when a user accesses the server in order to obtain the information. Thus, this rule is not fixed and may be updated.

Further, as described with reference to FIG. 6B, when the touch tag is recognized, the touch tag may be recognized regardless of a direction, and a conductive point expressing information does not have a specific mark for recognizing the location or direction of a figure. However, arrangement for recognizing the information can be obtained through a rule for recognizing the touch tag. For example, in the above example, the value of 75° is a value indicating that the information is correct, and corresponding information can be found through the remaining values arranged in order of size.

Meanwhile, some of the capacitive points may be imaginary without being used as values for finding the corresponding information. For example, after five capacitive points are recognized and a polygon is recognized, in the first arrangement rule, a vertex having a specific angle is excluded, and the polygon is recognized again. Then, by applying the second arrangement rule, information can be called.

As the above-described process is performed, the touch tag can be prevented from being forged/falsified or copied, and even when updating of the information is needed due to elapsing of time, only the arrangement rules are changed without changing the touch tag itself, so that the touch tag may correspond to new information.

Figure 7A:
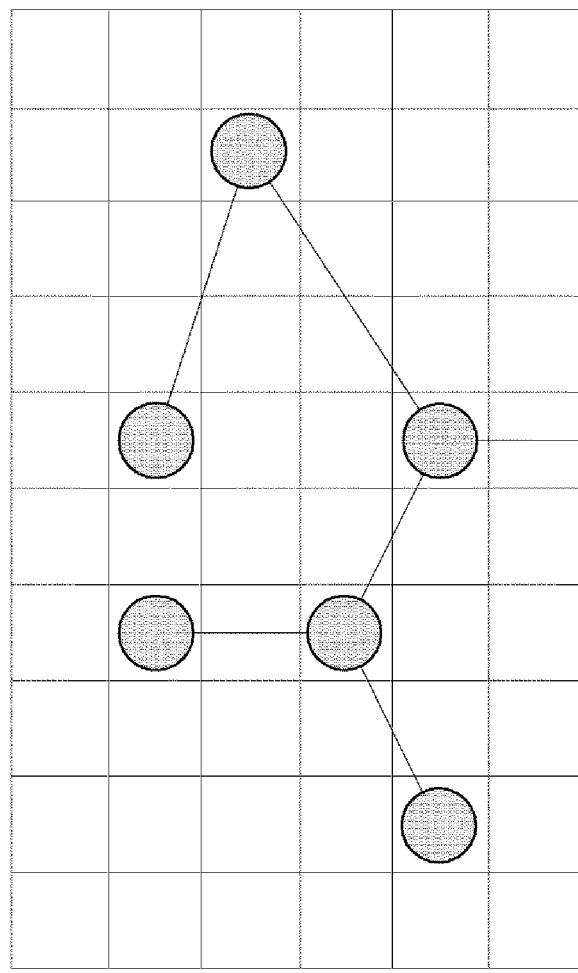
Figure 7B:
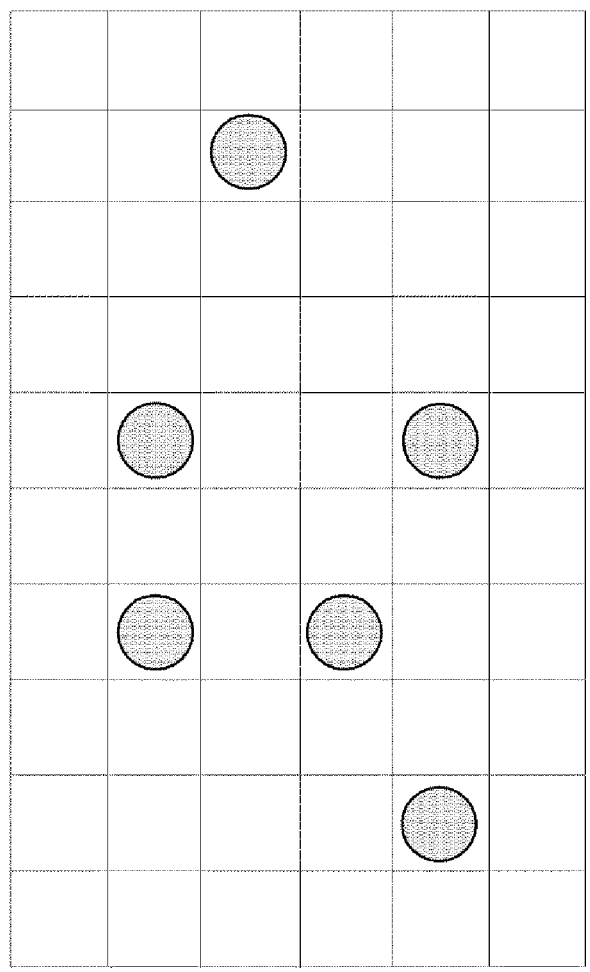
Figure 7C:
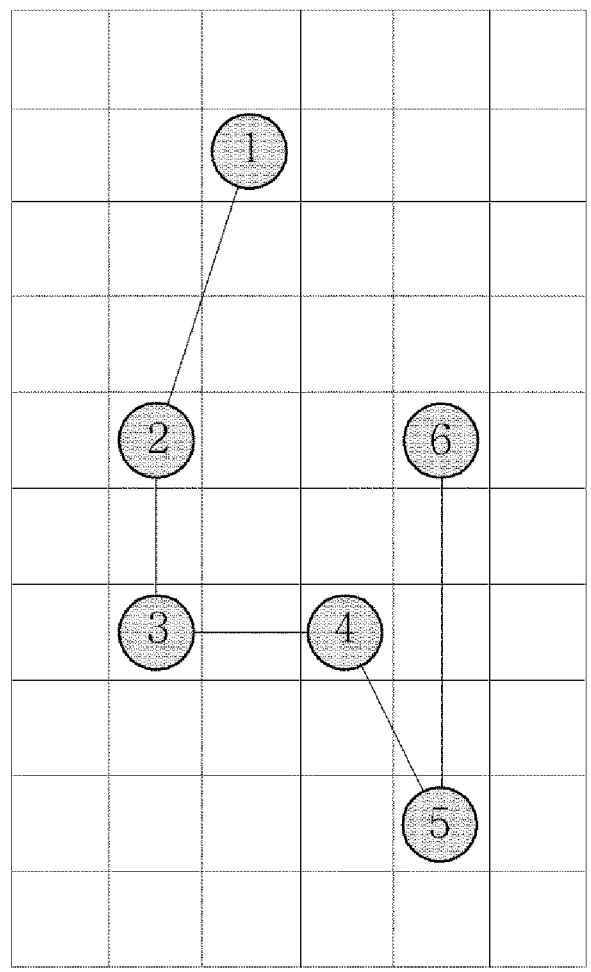

FIGS. 7A to 7C illustrate an information recognition method according to another embodiment of the present invention, and are schematic views illustrating capacitive touch tags, a state in which the touch tags are recognized through the capacitive touch panel of the smartphone device, and an order of recognizing information, respectively.

As illustrated in FIG. 7A, a pattern of the touch tags is a form in which a plurality of capacitive points are arranged randomly, and is recognized by the touch panel of the smartphone as illustrated in FIG. 7B.

A method for recognizing capacitive points is: determining a starting point; connecting the capacitive points in order from the starting point according to a predetermined rule, and recognizing a two-dimensional linear pattern formed by the capacitive points. For example, as illustrated in FIG. 7C, a point 1 having the largest inter-point distance is determined as a starting point, and starting from the starting point, a current point is preferentially connected to a lower point than the current point, and is connected to the closest point thereto when there is no lower point (connected to lower point: first-order rule, and connected to closest point: second-order rule). When the points are connected in this way, although the starting point and an end point should be connected to each other, the starting point and the end point are not connected to each other.

When the points are connected in this way, as illustrated in FIG. 7C, the capacitive points are connected in order of 1, 2, 3, 4, 5 and 6 so as to form a two-dimensional pattern, and information matching with the recognized two-dimensional pattern can be called from the server.

Here, the recognition direction and the connection rule are not determined in advance, and are changed by the server according to each date or each day of week, and the pattern of the capacitive points is formed according to the changed recognition direction and the changed connection rule, thereby preventing forgery/falsification or copy of the touch tag.

Further, like the embodiment described with reference to FIGS. 6A to 6C, it is possible to designate an imaginary capacitive point.

Meanwhile, in the present embodiment, since a current point should be connected to a next point lower than the starting point, a recognition direction of the touch tag should be matched with the touch panel, unlike the embodiment illustrated in FIGS. 6A to 6C. To this end, the application program of the smartphone may display the recognition direction of the touch panel through a screen of the smartphone.

Meanwhile, in yet another embodiment of the present invention, capacitive points are formed on the lattice in a form similar to a barcode, so that information may be recognized.

Figure 8A:
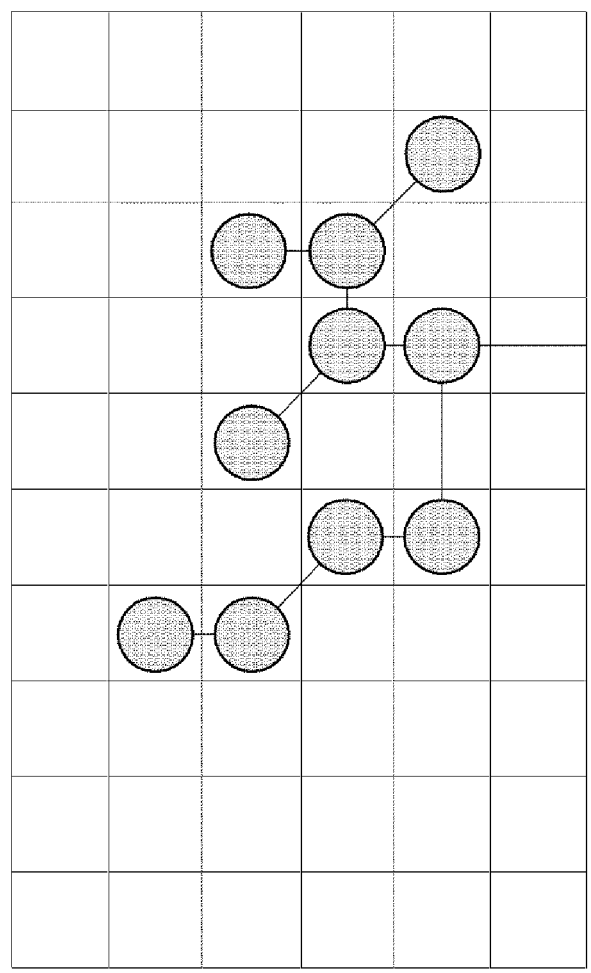
Figure 8B:
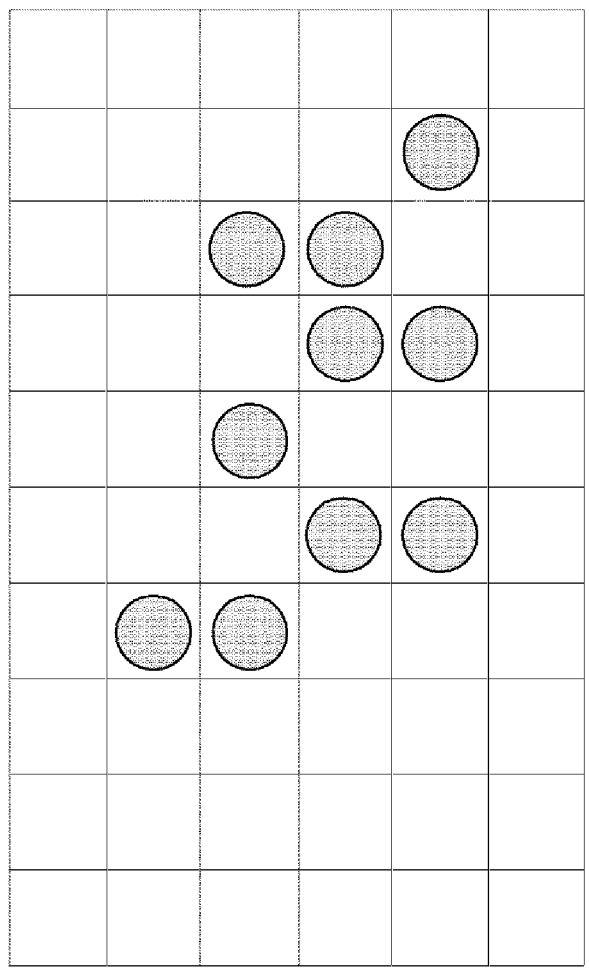
Figure 8C:
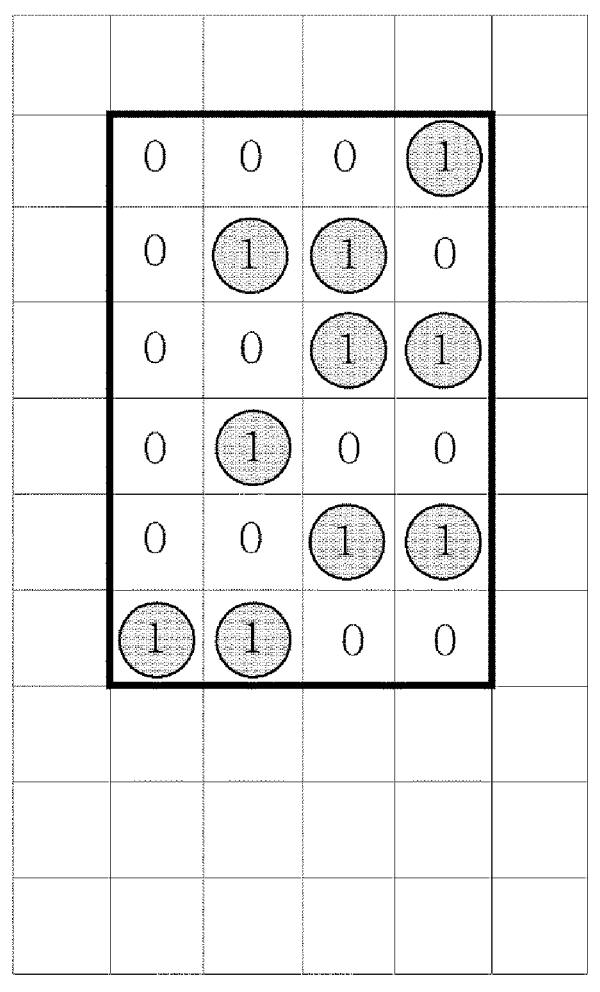

FIGS. 8A to 8C illustrate an information recognition method according to yet another embodiment of the present invention, and are schematic views illustrating a capacitive touch tag, a state in which the touch tag is recognized through the capacitive touch panel of the smartphone device, and a method for recognizing information, respectively.

As illustrated in FIG. 8A, the capacitive points formed on the touch tag are recognized on the touch panel of the smartphone, as illustrated in FIG. 8B.

Next, as illustrated in FIG. 8C, first, a matrix region containing information is configured, wherein a quadrangle region thereof is configured with reference to two points, which are located on the outermost portions and between which the distance is longest, among the capacitive points.

The matrix region is rotated, such that a short side is located on an upper side, with reference to a point obtained by intersecting sides, on which only points having a value of 0, except for the two reference points, are arranged, that is, the capacitive points are not formed, among four sides of the configured quadrangle region.

When the matrix region is fixed in this state, a matrix is created in which a point on a position where a capacitive point is formed has a value of 1 and other points have a value of 0. In case of a touch tag having arrangement illustrated in FIG. 8, the following matrix is created.

$$\begin{pmatrix} 0 & 0 & 0 & 1 \\ 0 & 1 & 1 & 0 \\ 0 & 0 & 1 & 1 \\ 0 & 1 & 0 & 0 \\ 0 & 0 & 1 & 1 \\ 1 & 1 & 0 & 0 \end{pmatrix}$$

In case of an embodiment illustrated in FIG. 8, since a reference side and a starting point are designated according to a predetermined rule, a user makes the touch tag and the touch panel come into contact with each other in an arbitrary direction without previously determining the recognition direction of the touch tag, so as to recognize the reference side and the starting point.

Further, the matrix may be changed according to methods for determining the reference side and the starting point, and accordingly, forgery/falsification or copy of information can be prevented.

It is obvious that two or more methods for recognizing capacitive points according to the above-described embodiments may be combined and used.

Figure 9A:
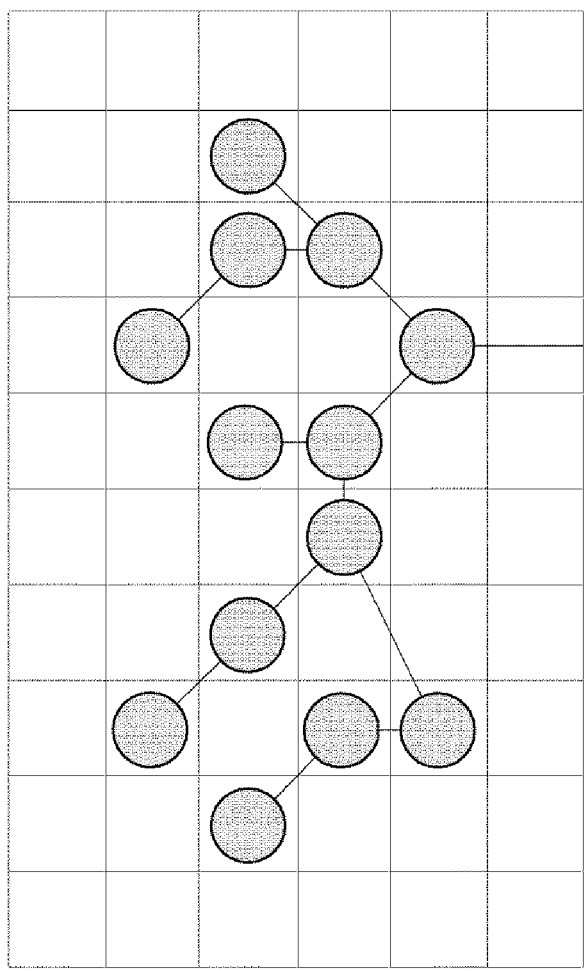
Figure 9B:
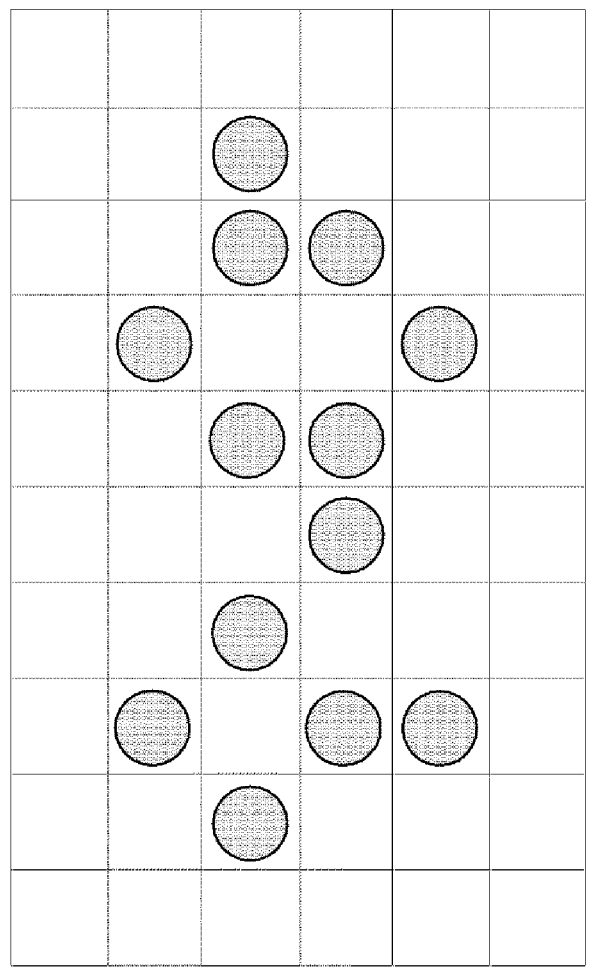
Figure 9C:
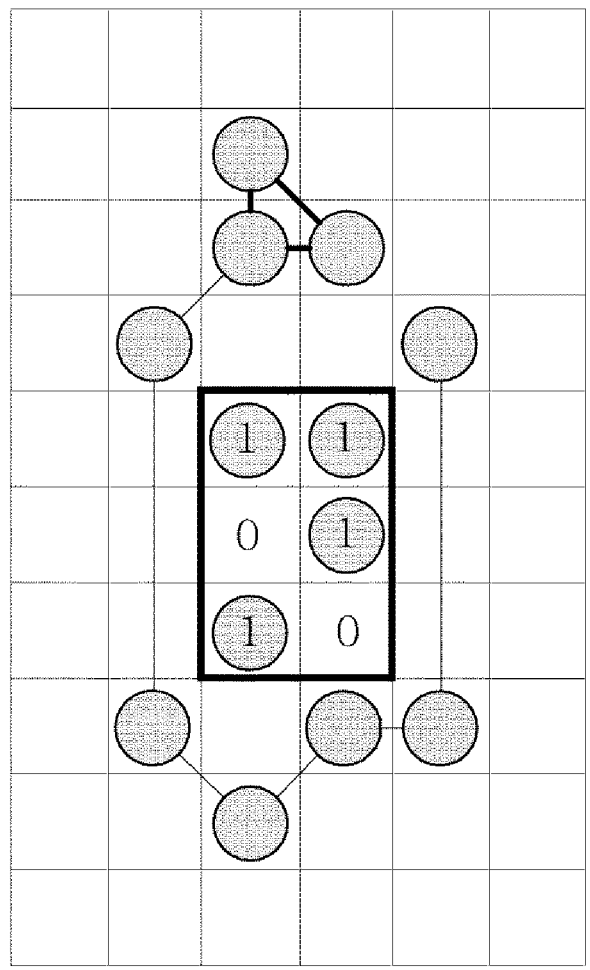

FIGS. 9A to 9C illustrate another embodiment of the present invention for recognizing capacitive points using the above-described three recognition methods. Like the above other embodiments, FIG. 9A is a schematic view illustrating a capacitive touch tag, FIG. 9B is a schematic view illustrating a state the touch tag is recognized through a capacitive touch panel of a smartphone device, and FIG. 9C is a schematic view illustrating a method for recognizing information.

When a touch tag having capacitive points formed as illustrated in FIG. 9A comes into contact with the touch panel of the smartphone, the touch tag is recognized on a touch pad as illustrated in FIG. 9B, each point is recognized as illustrated in FIG. 9C, and accordingly, information is called.

First, a polygon is recognized according to the method of the first embodiment described with reference to FIGS. 6A to 6C. At this time, a triangle formed by points, which are located on the outermost portion and between which the distance is short, among distributed capacitive points is firstly recognized.

Next, a vertex of the biggest inner angle among angles of this triangle is determined as a starting point, and the outermost points are connected to each other according to the lower side-priority first rule and the close distance-priority second rule, so that a two-dimensional pattern is recognized. Here, points of the previously recognized polygon are excluded, and the last point of the linear two-dimensional pattern is determined a point which should be connected to the starting point.

Finally, the remaining points creates a matrix as described in the third embodiment. Here, since points within the two-dimensional linear pattern are determined as points constituting the matrix, and the matrix region of the matrix may be fixed with reference to the starting point, the step in which the entire matrix region is determined and the matrix is rotated according to the reference point as described above may be omitted.

Various kinds of information formed in this way, that is, values of inner angles of polygon, a two-dimensional linear pattern, and matrix information, are properly combined with each other according to the rules, and the combined information is matched with information of the server, so that information corresponding to the touch tag may be called.

Like the above-described embodiments, a rule for combining recognized information according to the pattern of the capacitive points may be changed and used as needed, and it is obvious that some points among the capacitive points can be excluded.

Now, a method for recognizing information using a capacitive touch tag and a system therefor will be described in detail.

FIG. 10 schematically illustrates the entire configuration of an information recognition system using a touch tag and a smartphone device according to an embodiment of the present invention.

As illustrated in FIG. 10, the information recognition system according to the embodiment of the present invention includes a touch tag 10, a smartphone device 20, and a server 30.

The touch tag 10 may be provided in various forms such as a form attached to a product and, particularly, may be provided in a form in which a pattern formed on the touch tag 10 cannot be recognized by naked eyes. Further, the touch tag 10 is included in a part of a packaging of a product, and is damaged when the packaging is unpacked, thereby preventing information included in the touch tag from being leaked.

The smartphone device 20 is a personal information device having a capacitive touch panel which is generally used by a consumer. The smartphone device 20 is not necessarily a smartphone, and may include all personal information devices having a capacitive touch panel and a communication function, such as a tablet PC and a personal media player.

The server stores information corresponding to the touch tag and related to the product, and may further store additional information such as feedback information of a user in addition to that.

FIG. 11 is a flowchart illustrating the entire configuration of an information recognition system using a touch tag and a smartphone device according to an embodiment of the present invention. FIG. 11 illustrates the information recognition method with reference to the method for recognizing a touch tag according to the above-described first embodiment.

As illustrated in FIG. 11, when the touch tag comes in contact with the screen of the smartphone (S1110), positions of touch points are recognized on the touch panel of the smartphone (S1120).

Next, a position value of each of the touch points is converted into numerical data (S1130). After the position value of each of the touch points is converted into the numerical data, as described above with reference to FIGS. 6A to 6C, four angle values are calculated so as to obtain an address value. The address obtained in this way is stored in an array function, and values of integer type numbers are aligned as an index matched with the product (S1140).

Now, data values arranged as coordinates in this way are transmitted to the server (S1150).

The server compares whether the received data coincides with a value at a position of a predetermined pattern stored in the server (S1250).

As a result of the comparison, when the two values coincide with each other ("YES" in S1250), data corresponding to the coinciding values is transmitted to the smartphone device (S1260), and the smartphone device receives the data and displays the same (S1160).

As the result of comparison, when the two values do not coincide with each other ("NO" in S1250), the server transmits a message for re-recognizing the touch tag, to the smartphone device (S1280), and accordingly, a series of processes starting from the contact (S1110) with the screen of the touch tag may be repeatedly performed.

Meanwhile, after the information received from the server is displayed to a user, additional information including feedback on the corresponding information may be input from the user, and the data input in this way may be transmitted to the server (S1170).

The server stores, in a database, the additional information such as the feedback, which is received from the smartphone device (S1270). In this way, when the additional information is stored in the database, if the (another) user accesses the corresponding information using a touch code of the same pattern, such additional information may be provided together.

Meanwhile, after positions of the touch points are recognized, when a rule for obtaining an address value using the touch points is not designated in the application program of the smartphone, the corresponding rule may be received from the server, the address value may be configured according to the received rule, and the address value may be transmitted to the server.

Although exemplary embodiments of the present invention have been described in the above, it can be understood that those skilled in the art can variously modify and change the present invention without departing from the spirit and the scope of the present invention, which are appended in the following patent claims.

The invention claimed is:

1. A capacitive touch tag comprising:
a substrate;
a plurality of capacitive touch points which are formed on the substrate and are arranged at arbitrary positions on a virtual lattice corresponding to a touch input sector of a capacitive touch panel of a personal information device;
a conductive wire for connecting the capacitive touch points; and
an electric charge transfer unit for transferring electric charges to the capacitive touch points through the conductive wire,
wherein the capacitive touch points include a first point determined as a starting point according to a predetermined first rule, and information on the capacitive touch tag corresponds to a two-dimensional linear pattern, formed by connecting the capacitive touch points, starting from the first point, by a virtual line according to a predetermined second rule; and
wherein the capacitive touch tag is in contact with the capacitive touch panel of the personal information device.

2. The capacitive touch tag of claim 1, further comprising a protection film for covering the capacitive touch points and the conductive wire.

3. The capacitive touch tag of one of claim 1, wherein the electric charge transfer unit is a battery for generating electric charges and transferring the generated electric charges to the capacitive touch point, or a conductive connection unit for transferring electric charges to the capacitive touch points.

4. A capacitive touch tag comprising:
a substrate;
a plurality of capacitive touch points which are formed on the substrate and are arranged at arbitrary positions on a virtual lattice corresponding to a touch input sector of a capacitive touch panel of a personal information device;
a conductive wire for connecting the capacitive touch points; and
an electric charge transfer unit for transferring electric charges to the capacitive touch points through the conductive wire, wherein the capacitive touch points include a first point located within a rectangle, the size and the direction of which can be determined according to a predetermined rule, and information on the capacitive touch tag corresponds to a matrix having a constant size, which is created in a state in which the first point and a position on the lattice within the rectangle, where the first point is not formed, are distinguished from each other; and wherein the capacitive touch tag is in contact with the capacitive touch panel of the personal information device.

5. The capacitive touch tag of claim 4, further comprising a protection film for covering the capacitive touch points and the conductive wire.

6. The capacitive touch tag of claim 5, wherein the protection film is made of an opaque material, and is formed such that arrangement of the capacitive touch points cannot be recognized from the outside.

7. The capacitive touch tag of one of claim 4, wherein the electric charge transfer unit is a battery for generating electric charges and transferring the generated electric charges to the capacitive touch point, or a conductive connection unit for transferring electric charges to the capacitive touch points.

8. A capacitive touch tag comprising:
a substrate;
a plurality of capacitive touch points which are formed on the substrate and are arranged at arbitrary positions on a virtual lattice corresponding to a touch input sector of a capacitive touch panel of a personal information device;
a conductive wire for connecting the capacitive touch points;
an electric charge transfer unit for transferring electric charges to the capacitive touch points through the conductive wire; and
a protection film for covering the capacitive touch points and the conductive wire,
wherein there are three or more capacitive touch points, information on the capacitive touch tag corresponds to coordinate values including values of three or more angles configured by a virtual line connecting the capacitive touch points to each other, and
the protection film is made of an opaque material, and is formed such that arrangement of the capacitive touch points cannot be recognized from the outside; and
wherein the capacitive touch tag is in contact with the capacitive touch panel of the personal information device.

9. The capacitive touch tag of one of claim 8, wherein the electric charge transfer unit is a battery for generating electric charges and transferring the generated electric charges to the capacitive touch point, or a conductive connection unit for transferring electric charges to the capacitive touch points.

10. A method for recognizing information of a capacitive touch tag by a personal information device as the capacitive touch tag, comprising: a substrate; a plurality of capacitive touch points which are formed on the substrate and are arranged at arbitrary positions on a virtual lattice corresponding to a touch input sector of a capacitive touch panel of a personal information device; a conductive wire for connecting the capacitive touch points; and an electric charge transfer unit for transferring electric charges to the capacitive touch points through the conductive wire, comes into contact with the capacitive touch panel, the method comprising:
contacting the capacitive touch panel with the capacitive touch tag;
recognizing a position of the touch input sector corresponding to the capacitive touch points; and
creating coordinate values including values of inner angles of a polygon formed by a virtual line connecting the capacitive touch points to each other.

11. A method for providing information using a capacitive touch tag, the method comprising:
recognizing information of a capacitive touch tag according to the method of one of claim 10;
converting at least one of the coordinate values, the two-dimensional linear pattern, and the matrix into corresponding numerical data;
converting the numerical data into data for communication with a server;
transmitting the data for communication to the server;
receiving information data corresponding to the numerical data from the server; and
displaying the information data through the smartphone device.

12. The method of claim 11, further comprising:
receiving input of feedback data related to the information data from a user; and
transmitting the feedback data to the server.

13. A method for recognizing information of a capacitive touch tag by a personal information device as the capacitive touch tag, comprising: a substrate; a plurality of capacitive touch points which are formed on the substrate and are arranged at arbitrary positions on a virtual lattice corresponding to a touch input sector of a capacitive touch panel of a personal information device; a conductive wire for connecting the capacitive touch points; and an electric charge transfer unit for transferring electric charges to the capacitive touch points through the conductive wire, comes into contact with the capacitive touch panel, the method comprising:
contacting the capacitive touch panel with the capacitive touch tag;
recognizing a position of the touch input sector corresponding to the capacitive touch points; and
forming a two-dimensional linear pattern by connecting the capacitive touch points, starting from a first point determined as a starting point according to a predetermined first rule among the plurality of capacitive touch points, by a virtual line according to a predetermined second rule.

14. A method for providing information using a capacitive touch tag, the method comprising:
recognizing information of a capacitive touch tag according to the method of one of claim 13;
converting at least one of the coordinate values, the two-dimensional linear pattern, and the matrix into corresponding numerical data;
converting the numerical data into data for communication with a server;
transmitting the data for communication to the server;
receiving information data corresponding to the numerical data from the server; and
displaying the information data through the smartphone device.

15. The method of claim 14, further comprising:
receiving input of feedback data related to the information data from a user; and
transmitting the feedback data to the server.

16. A method for recognizing information of a capacitive touch tag by a personal information device as the capacitive touch tag, comprising: a substrate; a plurality of capacitive touch points which are formed on the substrate and are arranged at arbitrary positions on a virtual lattice corresponding to a touch input sector of a capacitive touch panel of a personal information device; a conductive wire for connecting the capacitive touch points; and an electric charge transfer unit for transferring electric charges to the capacitive touch points through the conductive wire, comes into contact with the capacitive touch panel, the method comprising:
contacting the capacitive touch panel with the capacitive touch tag;
recognizing a position of the touch input sector corresponding to the capacitive touch points; and
creating a matrix having a constant size in a state in which a first point, which is located within a rectangle, the size and the direction of which can be determined according to a predetermined rule, and corresponds to the capacitive touch points, and a second point, which is located within the rectangle and corresponds to a position of the touch input sector in which the first point is not formed, are distinguished from each other using different values.

17. A method for providing information using a capacitive touch tag, the method comprising:
recognizing information of a capacitive touch tag according to the method of one of claim 16;
converting at least one of the coordinate values, the two-dimensional linear pattern, and the matrix into corresponding numerical data;
converting the numerical data into data for communication with a server;
transmitting the data for communication to the server;
receiving information data corresponding to the numerical data from the server; and
displaying the information data through the smartphone device.

18. The method of claim 17, further comprising:
receiving input of feedback data related to the information data from a user; and
transmitting the feedback data to the server.

* * * * *